United States Patent Office 2,790,578
Patented Apr. 30, 1957

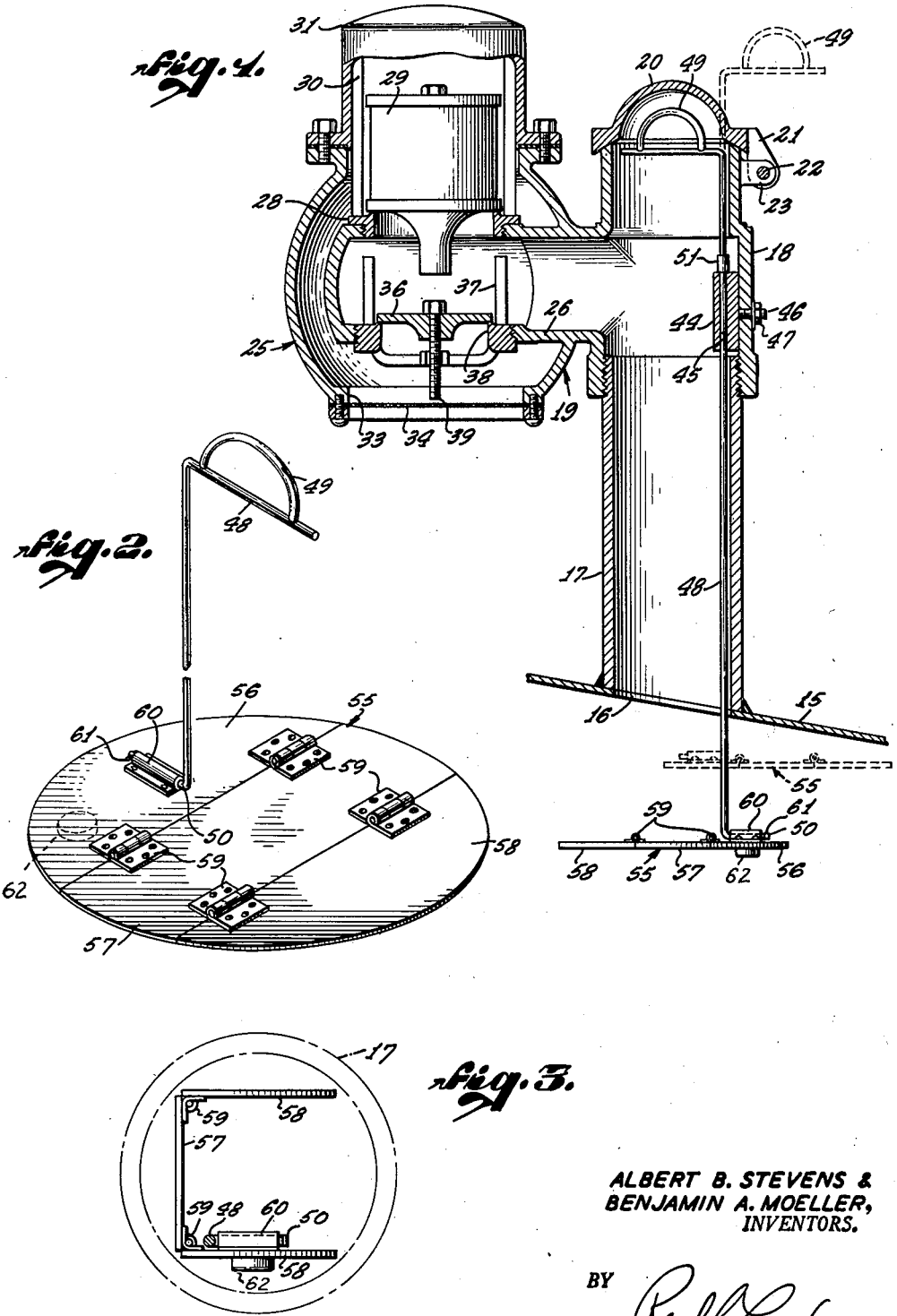

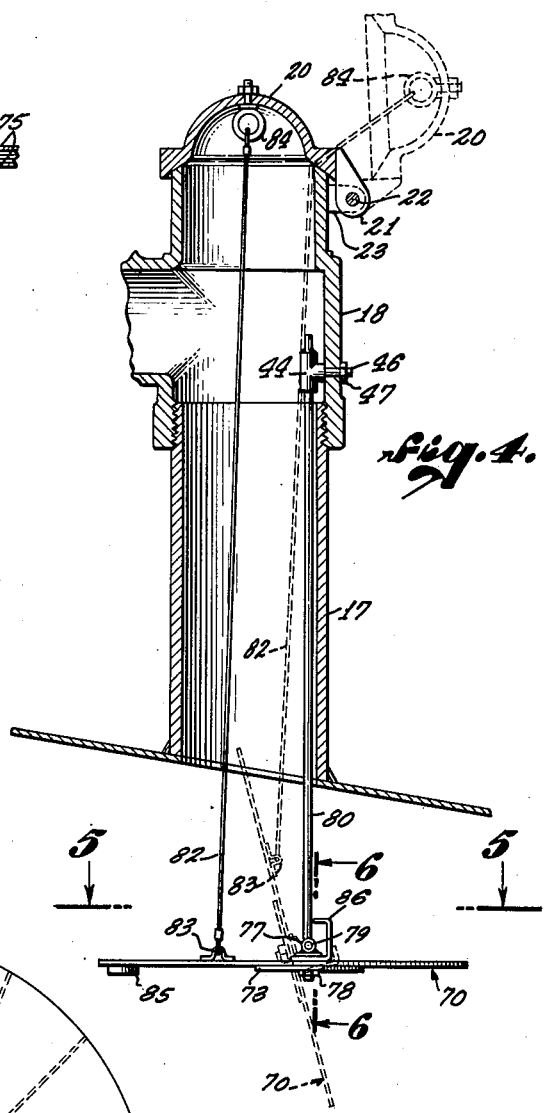

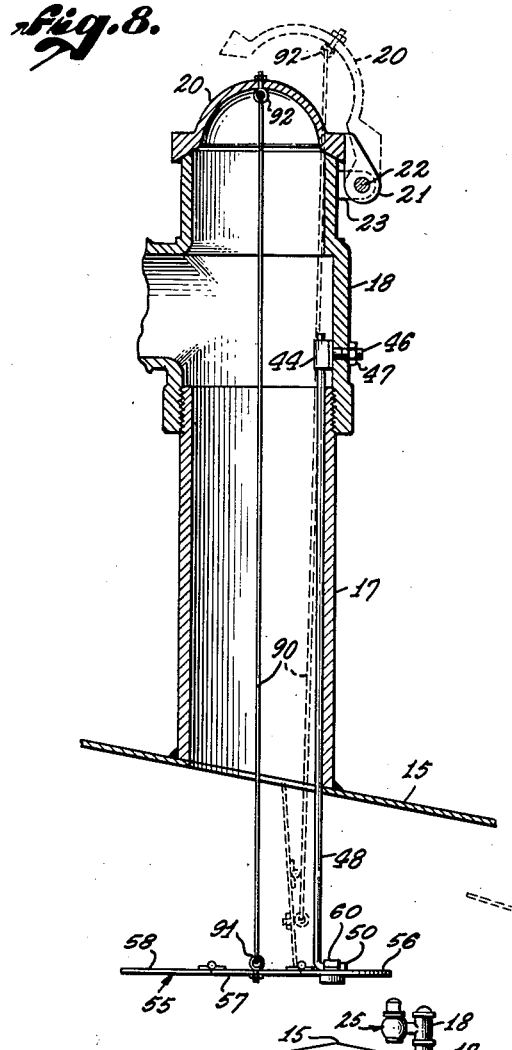
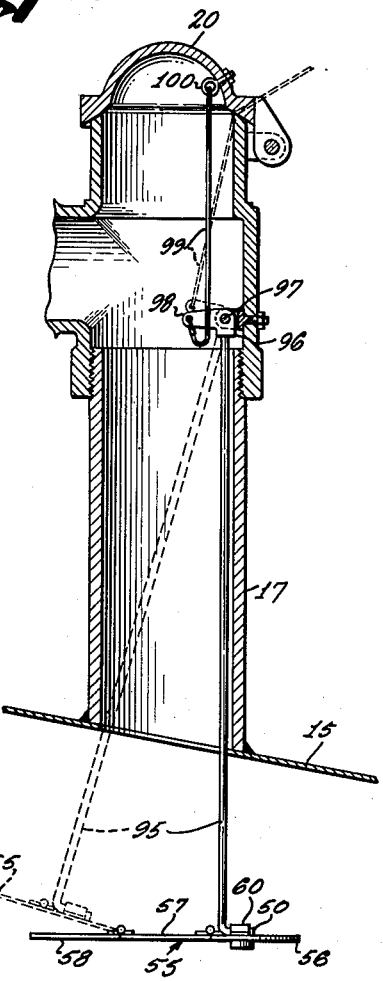
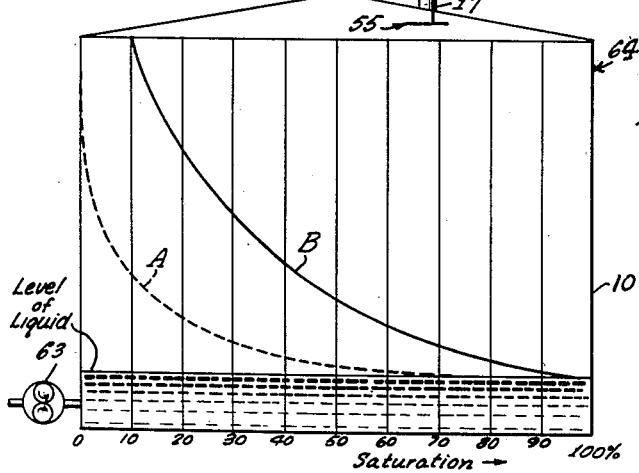
ALBERT B. STEVENS &
BENJAMIN A. MOELLER,
INVENTORS.
BY
ATTORNEY.

2,790,578

LIQUID CONSERVATION SYSTEM

Benjamin A. Moeller, Pasadena, and Albert B. Stevens, San Gabriel, Calif.

Application October 10, 1952, Serial No. 314,132

12 Claims. (Cl. 220—85)

Our invention is concerned generally with the storage of volatile liquids and relates to the venting of tanks and similar receptacles in which such liquids are stored. Specifically, the invention pertains to a device which functions to control the distribution of air entering the empty space above the volatile liquid in the tank, in a manner such that evaporation of the volatile liquid through the vent to the atmosphere is minimized.

It is a well known fact that a relatively great loss of volatile products, particularly aviation and motor gasoline, occurs due to evaporation in storage, transportation, and handling and that this represents a material loss to the producers, distributors, and vendors of these products. A very substantial portion of this loss is attributed to the wasteful evaporation of the products from storage tanks. Storage tank designs have been constantly improved with a view toward reducing such waste, such improvements involving pressure storage tanks, vapor recovery systems in connection with the tanks, and variable volume tanks such as floating roof tanks, gasometers, vapor spheres, etc. There still remain however, a large number of fixed volume tanks of the cone-roof type in which gasoline and other volatile products are stored and from which large quantities are lost annually by evaporation through the vents of the tanks. A so-called cone roof tank, as referred to above, is usually cylindrical in shape with either a flat or slightly coned roof. Another tank subject to high evaporation of its volatile vapor content is cylindrical in shape, with either flat or slightly bulged ends, such a tank usually being set up in a horizontal position.

The rate of evaporation of a volatile liquid, such as gasoline, is dependent upon the partial pressure of the vapor directly above the surface of the liquid. Since the partial pressure at the surface depends upon the rate at which vapor is diffusing upwardly or is being otherwise withdrawn from the air just above the liquid surface, the rate of evaporation and hence the rate of loss of vapor depends on these same factors.

The diffusion of gasoline vapor into air is a relatively slow process. Where there is no agitation or current within the vapor, diffusion progresses slowly between the layers of gasoline vapor and air, and it could take weeks or even months for a condition of substantially complete saturation to be attained within the vapor space in a tank, that is, the space above the volatile liquid.

But withdrawal of vapor from the air just above the surface and the migration upward of vapor to air at higher levels in a tank may be accelerated by stirring or agitating the contents of the vapor space. In the case of a mixture of galosine vapor and air, stirring not only mixes the existing gasoline vapor with the air which is present but because it reduces the partial pressure of the vapor just above the liquid surface, evaporation is accelerated. This mixing or stirring of the gases in the vapor space of a tank may take place in a number of ways in practice. For example, liquid being pumped into or even from a tank may cause a movement or current at the surface of the liquid with a resulting movement or stirring of the vapor layer immediately above, but this condition is thought to be slight and to have very little effect higher up in the vapor space. Stirring in the vapor space is also caused by daily and hourly changes in external temperatures and sunlight on the shell and roof of the tank. These conditions result in temperature differences within the vapor space causing convection currents which rise at one point and fall at another. Stirring and agitation of the gas in the vapor space is also caused by breathing as explained more fully below.

Cone roof tanks are not strong enough to withstand more than a nominal amount of excess pressure or vacuum and therefore means must be provided to relieve pressure or to draw in air when the temperature of the gas changes in the vapor space, or when liquid is being pumped in or out. To permit breathing in and out, tanks are provided with vents which, for gasoline and other volatile liquid tanks, are of the conservation type. Such a vent consists of a vertical pipe connected to the roof and opening into the vapor space, and on which is mounted a device which allows vapors to escape or permits air to be drawn in when predetermined changes in pressure occur.

The influx of air into a tank during the venting-in period is in a downward direction. The velocity of the air-vapor current within the tank which is set up by this influx may vary from practically zero to a speed in excess of 50 miles per hour, depending on conditions and the size of the vent. Speeds in the range of 7 to 20 miles per hour are very common. The air so admitted travels downward into the air-vapor mixture, agitating the air-vapor mixture and therefore causing an increase in total diffusion and evaporation.

It is therefore an important object of our invention to obviate the faults and deficiencies of storage tanks, and like receptacles, in which volatile liquids are stored, by providing a device which is installed in such a tank in association with the venting means thereof, said device serving as a baffle or deflector means for changing the direction of flow of air entering the tank through its vent passage. A related object is to provide such a device which is so constructed and arranged as to divert the downward flow of the air in such a manner as to reduce turbulence, agitation or other disturbances to the air-vapor layers existing below the device, with the result that the rate of intermixing of the various layers and hence the rate of evaporation of the gasoline is effectively minimized.

Another object of the invention is to provide a device, of the character referred to, which in its simplest form consists of a substantially horizontal plate or disc, located within the upper portion of the vapor space of the tank, directly below the opening of the usual vent pipe and at a distance such that it will not interfere with the normal inflow or outflow of air, and of sufficiently large area as to prevent unrestricted flow or streaming of the air through the vent pipe into the vapor space. By the use of such a deflector device, the downward velocity of the air entering the tank is substantially reduced and the air, being lighter in weight than the air-vapor mixture within the tank, comes to rest gently within the top portion of the tank to provide, in effect, a separating or buffer layer between the air-vapor mixture of relatively high density and the external atmosphere, the provision of such a layer being another object of our invention. If the ingress of air into the vapor space is in response to withdrawal of the volatile liquid from the tank, the air will tend to float or rest upon the top of the heavier air-vapor mixture and travel downwardly with it, in the manner of a piston. The relatively unmixed air will remain adjacent the top of the vapor space due to its relatively light density and when liquid is pumped into the tank, or when the temperature within the tank causes outbreathing, the vented vapor will be principally air, the denser air-vapor mixture remaining adjacent the level of the liquid.

Another object of the invention is to provide a vapor-turbulence inhibiting device, of the character and for the purpose specified, which includes a support rod disposed within the conventional vent pipe of a storage tank, or the like, with the lower end of the rod located at a distance below the lower end of the vent pipe, said rod being provided with mounting means at its lower end by which the baffle plate or disc is supported in operative position in alignment with and below the vent pipe.

Another object is to provide a device, of the class referred to, in which the baffle or deflector plate is composed of several sections hingedly connected to adapt them to be folded into a relatively small, compact unit capable of being readily inserted through the vent pipe when the device is installed on the tank, said sections being adapted for unfolding after the plate has been inserted into the tank through the vent pipe. A related object is to provide a plate in which at least one of said sections or leaves is pivotally connected to the lower end of the support rod so that the several folded sections of the unit may be arranged with their planes extending parallel to the axis of the rod for the purpose of reducing the size of the folded unit to small compass to further facilitate insertion thereof into the tank.

Another object is to provide, in a device of the type indicated, means for displacing the baffle or deflector plate from the axis of the vent pipe for the purpose of allowing insertion of a measuring stick or sampling means into the tank through the vent pipe. In one embodiment of our invention, this means consists of a bearing element within the vent pipe and mounted in place against a side thereof, the supporting rod for the deflector plate being arranged for axial sliding and pivotal movement in the element. By this particular mounting means, the support rod may be raised and turned to swing the deflector plate from alignment with the vent pipe, the rod being provided with a suitable handle at its upper end by which it is readily manipulated. In another embodiment, the support rod is held stationary while the deflector plate is adapted to be pivoted upwardly to provide access through the vent pipe. The plate preferably is pivoted upwardly in response to upward pull on a cord which has its lower end connected to the plate and its upper end preferably joined to the interior of a conventional pivoted cover which normally closes the upper end of the vent pipe, pivotal movement of the cover to open position effecting displacement of the deflector plate. In a still further alternative construction, the support rod is pivoted on a horizontal axis within the vent pipe and the above-mentioned cord is so connected to the rod that pivotal movement of the cover to open position effects pivotal movement of the rod to displace the deflector plate laterally from beneath the lower end of the vent pipe. The cover referred to above serves to normally close the hatch, the air and the air-vapor mixture passing through the conservation valve communicating with the interior of the hatch.

A further object of the invention is to provide an air deflector device which is particularly adapted for use in connection with a conventional vent valve of the so-called conservation type commonly employed on storage tanks of large capacities.

A still further object of our invention is to provide a device, of the character referred to, which is extremely simple in construction and economical to produce, one which is highly practical and efficient in operation, one which does not interfere with the sampling or gauging of the liquid content of the tank, and one which is readily installable in existing tanks without material alteration or modification of the venting means.

Further objects of the invention will appear from the following description and from the drawings, which are intended for the purpose of illustration only, and in which:

Fig. 1 is a vertical sectional view through a combined conservation vent valve, gauge hatch and vent pipe, representing the vent means of a storage tank, showing the baffle means or deflector device of this invention applied to use in connection therewith;

Fig. 2 is a perspective view of one form of the deflector device, the sections of the deflector plate being shown in extended, operative relation;

Fig. 3 is a plan view of the present device, showing the plate sections in folded relation to reduce the plate to a size capable of being readily inserted into the tank through the vent pipe;

Fig. 4 is a view similar to Fig. 1, showing a modified form of deflector device;

Fig. 5 is an enlarged sectional plan view, taken on line 5—5 of Fig. 4;

Fig. 6 is a sectional view taken on the line 6—6 of Fig. 4;

Fig. 7 is a side view of the deflector plate of Fig. 4, showing the segments of the plate collapsed to allow insertion of the deflector through the vent pipe;

Figs. 8 and 9 are views similar to Fig. 1, illustrating further alternative forms of the device; and Fig. 10 is a diagram or graph depicting a typical liquid storage tank and having superimposed thereon height vs. degree-of-vapor-saturation curves intended to illustrate the principle upon which our invention is based.

Referring first to Figs. 1 to 3 and Fig. 10 of the drawings, the present turbulence-reducing device is shown as applied to use in connection with a conventional constant-volume storage tank 64 having a cylindrical side wall 10 and a conical top wall or roof 15, said tank being employed for containing a supply of volatile liquid, such as aviation fuel or motor gasoline. The top wall 15 has an opening 16 and a vent passage means consisting of a vertical vent pipe or tube 17 welded or otherwise joined to the top wall in registry with the opening. Screwed onto the upper threaded end of the pipe 17 or otherwise attached thereto is the tubular hatch portion 18 of a vent valve housing 19. The upper tapered end of the hatch 18 normally is closed by means of a lid or cover 20 which, as shown, has an extension 21 pivoted on a pin 22 extending between ears 23 at the side of the hatch portion 18. The vent valve housing 19 has a hollow belt-like head or body 25 and an inner tubular branch 26 within the head, the branch being a lateral extension of the hatch portion 18 and communicating with the interior thereof.

Screwed into a threaded hole in the upper wall of the branch 26, within the body 25, is an upper valve seat ring 28. A weighted valve member 29 normally rests upon the ring 28, this member being slidable vertically between guides 30 within the body 25 and a dome-like closure 31. When vapor pressure within the storage tank exceeds atmospheric pressure by a predetermined amount, such excess pressure unseats the valve member 29 to allow escape of the vapor through the branch 26 and the ring 28 into the valve body 25 and thence through the opening 33 in the lower end of the body to the atmosphere. Thus, the means 28, 29 is a pressure-relief valve which opens automatically in response to excess pressure developed in the vapor chamber of the tank or to thermal expansion of the liquid and the heating of the air-vapor mixture therein.

A second valve plate member 36 is slidable vertically in guides 37 and normally rests upon an annular seat 38 screwed into a threaded hole in the bottom wall of the branch 26. When a partial vacuum develops within the tank due to withdrawal of liquid therefrom, or due to pressure reduction as a result of lowering of the temperature within the tank, in-breathing of air is necessary.

This is made possible by means of the valve 36 which, due to such suction, is raised from its seat 38 to allow ingress of air from the atmosphere through a screen 34 into the tank by way of the opening 33, annular seat 38, branch 26, hatch 18 and vent pipe 17.

Disposed against the inner surface of the hatch portion 18 at one side thereof is a bearing block 44 having a vertically extending hole 45. As shown, the block 44 has a threaded stem 46 which projects outwardly through a hole in the side of the hatch 18, a nut 47 screwed onto this stem and set up against the hatch serving to mount the block fixedly in place.

Slidable in the hole 45 is a mounting means consisting of a relatively long support rod 48, the upper end of which is provided with a handle 49. The lower end of the rod 48 extends to a point below the top 15 of the storage tank and its extremity is bent at a right angle to the rod to provide a mounting pin 50 which extends in the opposite lateral direction from the handle 49. A collar 51 on the rod 48 normally rests against the upper end of the block 44 to limit the downward sliding movement of the rod under the influence of gravity.

The mounting pin 50 serves to support a deflector plate or baffle 55 which, as shown, may be of circular configuration. The plate 55 is composed of a plurality of sections 56, 57 and 58 which are pivotally connected, one to another, by means of hinges 59. The section 56 carries a tubular bearing element 60, the axis of which is normal to the axes of the hinges 59, the element 60 receiving the pin 50 of the rod 48 to pivotally connect the plate 55 thereto. A weight 62 is arranged on the plate section 56 which is pivoted on the mounting pin 50.

To install the deflector device within the vent pipe 17, the device is pre-assembled by sliding the collar 51 onto the rod 48, sliding the bearing block 44 onto the rod, bending the lower end of the rod to provide the pivot pin 50, after which the deflector plate 55 is mounted on the pin by sliding its bearing element 60 thereon. The plate 55 is next pivoted on the pin 50 to a position where its plane extends parallel to the axis of the support rod 48, after which the sections 57 and 58 are pivoted with respect to each other and relative to the section 56 into a U-shape or channel, as shown in Fig. 3. The deflector plate 55 thus is reduced to a size which enables it to be passed downwardly through the hatch 18 and vent pipe 17 and into the upper portion of the tank. After the rod 48 has been slid downwardly to lower the deflector plate to the position shown in Fig. 1, the bearing block 44 is secured in place by passing its stem 46 through the hole in the wall of the hatch 18 and applying the nut 47. With the device thus installed, the sections of the plate 55 are unfolded to the coplanar relation illustrated in Figs. 1 and 2, this being accomplished by simply inserting a wire or other elongate tool to engage and pivot the sections or by permitting the plate sections to fall into place under the influence of the weight 62. Suitable detent means, indicated at 61, are provided for yieldingly retaining the deflector plate or baffle 55 at right angles to the rod 48.

With the device thus assembled and installed within the vent pipe 17, the sectional plate 55 serves as a means for deflecting air entering the tank 64 (Fig. 10) through the vent pipe 17. That is to say, air drawn into the tank 64 through the valve 36, passage 26 and pipe 17, due to in-breathing caused by withdrawal of liquid from the tank by means of a pump 63 (Fig. 10), impinges against the plate 55 and is deflected laterally thereby.

Thus, the air is caused to enter the upper zone of the vapor chamber of the tank, that is, adjacent the upper portion of the tank, and to remain there except for intermixing by diffusion and convection. Consequently, the incoming air does not descend rapidly to a level where it might stir up and mix with the volatile vapor of heavy density but rather tends to remain substantially in its natural state above the vapor layer which occurs directly above the level of the gasoline or other volatile liquid. This upper zone of light density gas thus floats or rests above the lower zone and serves, in effect, as a separator or buffer between said lower vapor-rich zone and the atmosphere.

While the velocity of the air entering the tank may be relatively great, it has been determined that the deflector plate 55 effectively diverts the air stream laterally into the upper conical roof portions of the tank, reducing its velocity with the result that mixing of the incoming air with the fuel vapor is minimized. To be more specific, air introduced into the tank is prevented from descending directly to the lower portion of the vapor chamber in a forceful stream, as is the case in conventional storage tanks employing no deflector means, and is retained within the upper zone of the vapor chamber to mix only with the vapor of lighter density directly beneath this zone, by diffusion and convection. Moreover, since the air is transformed from a high velocity stream to a substantially static layer which remains in the upper portion of the tank, agitation or turbulence, which might otherwise occur in the lower high density vapor layers, is practically wholly avoided. Thus, by the use of our air deflector or baffle device, the vapor of dense character remains undisturbed by the ingress of air into the tank. Thus, the air-vapor mixture in the lower portion of the vapor zone is rich in volatiles, while that in the upper portion is lean, the concentration or partial pressure of vapor increasing from a high value at the bottom to a low value at the top of the vapor zone. Due to this desirable condition, when out-breathing through the vent takes place, as when volatile liquid is again introduced into the tank or when thermal expansion of the tank contents occurs, the layer of very lean mixture present in the upper portion of the tank is discharged first, while rich mixture of greatest density remains in the tank. Thus, the rate of loss of the valuable vapor content is minimized, resulting in a substantial saving of the volatile liquid.

While the air entering the upper portion of the tank will obviously mix with the vapor present in the vapor chamber above the liquid level, it will be apparent that since the influx of this air is confined to the upper zone of the chamber, it will mix only with the vapor of least density and thus the degree or magnitude of saturation near the top will remain relatively low for longer periods. This highly desirable condition is attributed largely to the fact that streaming of the incoming air into the lower zone of high density, to cause the air to mix with the high density vapor, and to agitate this vapor to displace it upwardly into the lower density zone, is effectively avoided.

Referring to Fig. 10, the curves A and B indicate the approximate saturation of gasoline vapor in the air occurring in the tank above the level of the gasoline. The dotted-line curve A is intended to designate the percent of saturation at the time that air is injected into the tank and retained in the upper portion thereof by the present baffle or deflector plate. Considering this curve, it will be seen that the degree of saturation is greatest in the zone adjacent the level of the gasoline and approaches nearly 100 percent. It is to be noted that the percent of saturation gradually and progressively diminishes toward the top of the tank and that the percentage is reduced to practically nil in the upper portion of the vapor chamber. After a standing period of considerable duration, the saturation percentages will be substantially as indicated by the curve B, it being observed that the percent of saturation occurring in the uppermost zone increases from zero to approximately ten, at which point it will remain substantially stable or increase at a slow rate. Thus, during out-breathing of the tank, the amount of vapor discharged through the vent pipe is low. This is an important improvement over conventional storage tanks having no baffle means and in which the air-vapor mixture within the upper zone may reach approximately 40 to 50 percent of saturation to cause a high rate of loss through the vent during the out-breathing process.

It is extremely difficult to estimate with any degree of certainty the reduction in evaporation attained through the use of our deflector or baffle device for minimizing the turbulence in the vapor space and reducing the percent of saturation in the upper zone of said space. The overall loss by evaporation, and therefore the quantity which may be saved through the use of the instant device, depends largely upon many variables such as the vapor pressure of the stored product, the temperature of the vapor space, variations in such temperature, the size and shape of the tank, the condition of the tank exterior with regard to heat reflecting qualities, meteorological conditions, and the rate and manner of introducing the volatile liquid into and withdrawing it from the tank. It is possible, however, by using a definite set of assumed conditions and applying data of reasonable accuracy as to the loss to be expected under these conditions, to estimate the reduction in evaporation which may be attained through the use of our device. For example, considering a storage tank of a size 120 feet in diameter by 42 feet high, having a capacity of 80,000 barrels of motor gasoline and normally handling approximately 1,200,000 barrels annually of the fuel, at average vapor pressure of gasoline at storage, and other factors such as mechanical condition of the tank, filling and withdrawal rates being average, the normal loss to be expected from such a tank, without the deflector, operating under such conditions would be approximately 3,800 barrels of gasoline annually. Such loss results from the large volumes of gasoline-vapor laden air being ejected from the tank during the filling periods and during the periods of heating and expansion of the vapors. Tests conducted with tanks equipped with our deflector means indicate a reduction in such evaporative loss of the order of 10 to 50 percent, depending on conditions. It is therefore apparent that the use of our baffle or deflector plate results in a material saving of the volatile liquid and, consequently, a considerable saving in money.

Referring now to Figs. 4 to 7, our invention also contemplates a deflector device of modified construction in which the deflector plate 70 is collapsible and consists of a plurality of wires 71 radiating from a central wire ring 72 which is carried by a plate or disc 73. A circular piece of fabric 75 is secured in place upon the radial wires 71. The plate assembly 72, 73, 75 is mounted on the depending stud 76 of a pivot sleeve element 77, by means of a nut 78 screwed onto the lower end of the stud.

The deflector plate 70 is pivotally carried on the lower bent end 79 of a support rod 80. The rod 80 extends downwardly through the vent pipe 17 from the block 44 to locate the deflector plate at a predetermined distance below the vent pipe. The plate 70 is adapted to be pivoted upwardly on the bent end 79 of the rod 80, to the position indicated by the broken lines in Fig. 4, so as to provide clearance for a gauge or dip-stick or sampling device which may be inserted through the vent pipe into the tank to measure the contents thereof. The plate is pivoted upwardly by means of a pull-cord 82, the lower end of which is attached to a loop 83 carried by one of the wires 71. The upper end of the cord 82 is connected to an eye element 84 within the lid or cover 20 of the hatch 18. By this means, when the cover 20 is raised the deflector plate 70 is pivoted upwardly and when the cover is closed, the plate pivots downwardly to its operative position under the influence of gravity, it being noted that the pivot means 79, 77 is offset laterally with respect to the center of the plate. A weight 85 carried by one of the wires 71 aids in pivoting the plate downwardly and such movement of the plate is limited by the engagement of a wire finger 86 on the plate with the side of the rod 80.

The plate 70 is adapted to be collapsed, as shown in Fig. 7, to facilitate its insertion through the vent pipe 17 into the tank, the wires 71 being flexible to permit such reduction in size. After the folded plate has passed through the vent pipe 17, it wires spring downwardly to open the deflector plate.

Referring now to Fig. 8, it is also within the present concept to provide a deflector device which involves the use of a baffle plate 55 such as that shown in Figs. 1 and 2 and including the hinged segments or sections 56, 57 and 58, the plate section 56 being fixedly connected to the bent end 50 of the support rod 48. A pull-cord 90, connected between a loop element 91 on the plate section 57 and an eye bolt 92 on the lid or cover 20, functions automatically to pivot the sections 57 and 58 upwardly when the cover 20 is opened, so as to provide clearance in the vent pipe through which a measuring stick or sampling device may be inserted into the tank.

In the alternative construction illustrated in Fig. 9, the deflector plate 55 is also carried at the lower end of a support rod 95. In this embodiment, the rod 95 is carried by an element 96 which is pivoted on a pin 97 within the hatch 18. The element 96 has a lateral finger 98 to which one end of a pull-cord 99 is attached, the other end of the cord being joined to an eye-bolt 100 carried on the interior of the cover 20. When the cover 20 is opened, the cord 99 acts to pivot the finger 98 upwardly so as to cause the plate 55 to move laterally to the position indicated by the broken lines so as to provide clearance for a measuring stick or sampling device inserted through the vent pipe 17.

While our invention has been described in detail with reference to certain embodiments thereof, it will be understood that changes may be made therein and that the invention may be incorporated in other embodiments without departing from the spirit and the principles of the invention. Thus, for example, it will be understood that the range of movement of the deflector plate may be made sufficiently large to accommodate a sampling device of any particular size. Also, of course, if it is not necessary to introduce a sampling device or a measuring stick through the vent, as is the case where a separate gauge hatch is provided, it is not necessary to provide any means whatever for displacing the baffle plate from the axis of the vent and the baffle plate may be mounted in a fixed position therein.

It is, therefore, to be understood that the invention is not limited to the specific embodiments or to the details that have been described herein but includes other variations and embodiments thereof coming within the scope of the appended claims.

The invention claimed is:

1. In combination with a storage tank or like receptacle for containing volatile liquid, said tank having a vent passage means in its upper wall through which air may enter and discharge from the vapor space above the surface of the volatile liquid, an air-deflector device including: a collapsible deflector plate insertable through said vent passage means into the tank to a position in alignment with and below the lower end of the vent passage means to extend substantially normal to the axis of the same, said plate also being removable from the tank through said vent passage means; and supporting means associated with the vent passage means and supporting the deflector plate stationary in said position.

2. In combination with a storage tank or like receptacle for containing volatile liquid, said tank having a vent passage means in its upper wall through which air may enter and discharge from the vapor space above the surface of the volatile liquid, an air-deflector device including: a collapsible deflector plate of larger area than the cross-sectional area of the vent passage means, said plate while collapsed being insertable through said vent passage means into the tank to a position in alignment with and below the lower end of the vent passage means to extend substantially normal to the axis of the same, said plate being removable from the tank through said vent passage means; and supporting means associated with the vent passage means and supporting the deflector plate stationary in said position.

3. In combination with a storage tank or like receptacle for containing volatile liquid, said tank having a vent passage means in its upper wall through which air may enter and discharge from the vapor space above the surface of the volatile liquid, an air-deflector device including: a collapsible deflector plate of larger area than the cross-sectional area of the vent passage means, said plate when collapsed being insertable through said vent passage means into the tank to a position in alignment with and below the lower end of the vent passage means to extend substantially normal to the axis of the same, said plate also being removable from the tank through said vent passage means; and supporting means associated with the vent passage means and supporting the deflector plate stationary in said position, said supporting means including a rod detachably connected at one end to said vent passage means and at its other end to said plate, said supporting means being located within said vent passage means and readily accessible from the upper end thereof.

4. In combination with a storage tank or like receptacle for containing volatile liquid, said tank having a vent passage means in its upper wall through which air may enter and discharge from the vapor space above the surface of the volatile liquid, an air deflector device including: a deflector plate of larger area than the cross-sectional area of the vent passage means, said plate being insertable into the tank to a position in alignment with and below the lower end of the vent passage means to extend substantially normal to the axis of the same, said deflector plate being composed of a plurality of sections foldable relative to one another to allow collapsing of the plate to a size enabling insertion of the plate through said vent passage means; and supporting means associated with the vent passage means and supporting the deflector plate in said position, said supporting means including a rod detachably connectible at one end to said vent passage means and at its other end to said plate.

5. In combination with a storage tank or like receptacle for containing volatile liquid, said tank having a vent passage means in its upper wall through which air may enter and discharge from the vapor space above the surface of the volatile liquid, an air-deflector device including: a deflector plate of larger area than the cross-sectional area of the vent passage means, said plate being insertable into the tank to a position in alignment with and below the lower end of the vent passage means to extend substantially normal to the axis of the same, said deflector plate being composed of a plurality of sections pivotally connected to one another to allow collapsing of the plate to a size enabling insertion of the plate through said vent passage means; and supporting means associated with the vent passage means and supporting the deflector plate in said position, said supporting means including a rod detachably connectible at one end to said vent passage means and at its other end to said plate.

6. In combination with a storage tank or like receptacle for containing volatile liquid, said tank having a vent passage means in its upper wall through which air may enter and discharge from the vapor space above the surface of the volatile liquid, an air-deflector device including: a deflector plate of larger area than the cross-sectional area of the vent passage means, said plate being insertable into the tank to a position in alignment with and below the lower end of the vent passage means to extend substantially normal to the axis of the same; and supporting means associated with the vent passage means and supporting the deflector plate in said position, said deflector plate being composed of a plurality of sections foldable relative to one another to allow collapsing of the plate to a size enabling insertion of the plate through said vent passage means.

7. In combination with a storage tank or like receptacle for containing volatile liquid, said tank having a vent passage means in its upper wall through which air may enter and discharge from the vapor space above the surface of the volatile liquid, an air-deflector device including: a deflector plate insertable into the tank to a position in alignment with and below the lower end of the vent passage means to extend substantially normal to the axis of the same; supporting means associated with the vent passage means for supporting said deflector plate in said position; and means normally located within said vent passage means for displacing said plate from said position to a position out of alignment with the axis of the vent passage means.

8. In combination with a storage tank or like receptacle for containing volatile liquid, said tank having a vent passage means in its upper wall through which air may enter and discharge from the vapor space above the surface of the volatile liquid, an air-deflector device including: a deflector plate; mounting means movably supporting said plate, said plate being insertable into the tank through said vent passage means to a position in alignment with and below the lower end of the vent passage means to extend substantially normal to the axis of the same and being displaceable within the tank from said position so as to provide access through said vent passage means to the interior of the tank; and means normally disposed within said vent passage means and accessible at the upper end thereof for displacing said plate.

9. In combination with a constant volume storage tank or like receptacle for containing volatile liquid, said tank having a vent pipe in its upper wall through which air may enter and discharge from the vapor space above the surface of the volatile liquid: supporting means mounted within said vent pipe and extending downwardly into the tank; and a deflector plate movably carried by said supporting means and normally disposed in alignment with and below the lower end of the vent pipe and normally extending substantially normal to the axis of the same, said deflector plate being movable from its normal operative position to an inoperative position out of alignment with the axis of said vent pipe so as to provide access through the pipe to the interior of the tank.

10. In combination with a constant volume storage tank or like receptacle for containing volatile liquid, said tank having a vent pipe in its upper wall through which air may enter and discharge from the vapor space above the surface of the volatile liquid: supporting means mounted within said vent pipe and extending downwardly into the tank; a deflector plate movably carried by said supporting means and normally disposed in alignment with and below the lower end of the vent pipe and normally extending substantially normal to the axis of the same, said deflector plate being movable from its normal operative position to an inoperative position out of alignment with the axis of said vent pipe so as to provide access through the pipe to the interior of the tank; and means operatively connected to said plate for moving the same to its said inoperative position.

11. In combination with a constant volume storage tank or like receptacle for containing volatile liquid, said tank having a vent pipe in its upper wall through which air may enter and discharge from the vapor space above the surface of the volatile liquid, and a cover normally closing the upper end of the vent pipe but movable to an open position to open the pipe: supporting means mounted within the vent pipe and extending downwardly into the tank; a deflector plate movably carried by said supporting means and normally disposed in alignment with and below the lower end of the vent pipe and normally extending substantially normal to the axis of the same, said deflector plate being movable from its normal operative position to an inoperative position out of alignment with the axis of said vent pipe so as to provide access through the pipe to the interior of the tank; and means operatively connected between said cover and said deflector plate and operative automatically upon opening of the cover to move the plate to its said inoperative position.

12. In combination with a constant volume storage tank or like receptacle for containing volatile liquid, said tank having a vent pipe in its upper wall through which air may enter and discharge from the vapor space above the surface of the volatile liquid, and a cover normally closing the upper end of the vent pipe but movable to an open position to open the pipe; supporting means mounted within the vent pipe and extending downwardly into the tank; a deflector plate movably carried by said supporting means and normally disposed in alignment with and below the lower end of the vent pipe and normally extending substantially normal to the axis of the same, at least a portion of said deflector plate being movable from its normal operative position to an inoperative position out of alignment with the axis of said vent pipe so as to provide access through the pipe to the interior of the tank; and means operatively connected between said cover and said deflector plate and operative automatically upon opening of the cover to move at least a portion of the plate to its said inoperative position.

References Cited in the file of this patent

UNITED STATES PATENTS

| | | |
|---|---|---|
| 291,084 | Reinecke | Jan. 1, 1884 |
| 1,138,470 | Hackney | May 4, 1915 |
| 1,155,447 | Saunders | Oct. 5, 1915 |
| 1,235,174 | Williams | July 31, 1917 |
| 1,360,569 | Orr | Nov. 30, 1920 |
| 1,442,525 | Howard | Jan. 6, 1923 |
| 1,506,708 | Wolfe | Aug. 26, 1924 |
| 1,813,554 | Wickline | July 7, 1931 |
| 1,929,702 | McDonald | Oct. 10, 1933 |
| 2,232,573 | Teves | Feb. 18, 1941 |
| 2,453,274 | Serowy | Nov. 9, 1948 |
| 2,565,029 | Kemper | Aug. 21, 1951 |
| 2,701,998 | Wulle | Feb. 15, 1955 |

FOREIGN PATENTS

| | | |
|---|---|---|
| 393,991 | Germany | Apr. 19, 1924 |
| 169,896 | Switzerland | Mar. 1, 1935 |